3,137,679
LUBRICATING OIL ADDITIVES
Peter J. V. J. Agius, Abingdon, Joan D. Bryan, Westbury Park, Bristol, and Thomas A. Garbett, Botley, near Oxford, England, assignors to Esso Research and Engineering Company, a corporation of Delaware
No Drawing. Filed Sept. 28, 1959, Ser. No. 842,558
Claims priority, application Great Britain Mar. 23, 1956
8 Claims. (Cl. 260—78.5)

The present invention relates to improved oil-soluble polymeric lubricant additives and compositions. More particularly, the invention relates to improved lubricant additives comprising tripolymers of unsaturated dibasic acid esters, unsaturated esters of monocarboxylic acids and N-vinyl substituted cyclic amides, and to oil compositions containing said additives.

This case is a continuation-in-part application of U.S. application S.N. 645,645, and now abandoned, filed March 12, 1957.

The use of additives to improve various properties of lubricants is well known in the art. Additives have been developed for use in lubricants to inhibit corrosion, reduce wear, improve viscosity and viscosity indices, inhibit sludge, and to prevent the formation of carbon and varnish on the parts lubricated. To accomplish these functions, many different types of additives have been developed and added to the basic lubricating composition, each additive serving to improve one or more properties of the lubricant.

It has now been found that certain polymeric additives will function to improve several properties of the lubricating composition. The tripolymeric additives of this invention have been found to inhibit sludge (impart detergent properties), increase viscosity and viscosity index, and improve the shear stability of the lubricant over wide temperature ranges.

The additives of the present invention comprise an oil soluble tripolymer consisting essentially of about 30 to 50 mole percent of an ester of an unsaturated dicarboxylic acid, 1 to 35 mole percent of an N-vinyl substituted cyclic amide and 15 to 69 mole percent of an ester of an unsaturated alcohol and a monocarboxylic acid. The proportions relate to the mole percent of each of the monomers present per mole of tripolymer.

The N-vinyl substituted cyclic amides used in the present invention are those cyclic compounds in which the amido group forms part of the ring as in a pyrrolidone. Compounds such as benzamide would not be considered to be a cyclic amide. The preferred cyclic amides are those in which the amido group is contained in a 5 or 6 member ring which ring may be fused to another ring system. The N-vinyl substituted cyclic amides can be substituted with alkyl groups containing from 1 to 16 carbon atoms, e.g., 1 to 6 carbon atoms. N-vinyl butyrolactam is an example of the preferred N-vinyl amides useful in the present invention. N-vinyl butyrolactam is represented by the following general formula:

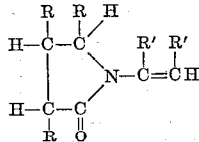

wherein R and R' are selected from the group consisting of hydrogen and $C_1$ to $C_{12}$ alkyl groups and at least one of the R groups being hydrogen. A particularly preferred cyclic amide is N-vinyl pyrrolidone, i.e., wherein all "R" and "R'" groups in the general formula described above are hydrogen.

Pyrrolidone is obtained from butyrolactone by reaction with ammonia at elevated temperatures. A mixture of the pyrrolidone thus obtained and potassium hydroxide can then be vinylated with acetylene at elevated pressures to give N-vinyl pyrrolidone. The butyrolactone is obtained as a by-product of wood carbonization.

The unsaturated dicarboxylic acid ester monomer of the tripolymer of this invention is prepared by reacting 2 moles of a saturated alcohol of 1 to 20 carbon atoms per molecule with 1 mole of an unsaturated dicarboxylic acid having 2 to 10 carbon atoms per molecule. The unsaturated dicarboxylic acid will preferably be fumaric or maleic acid.

Suitable alcohols used in preparing the unsaturated dibasic acid esters are monobasic saturated aliphatic alcohols, such as methyl alcohol, amyl alcohol, decyl, lauryl, N-octyl, 2 ethylhexanol, tetra-decyl, cetyl, stearyl, and isooctyl alcohols. Mixtures of alcohols may be employed in the preparation of the ester monomer thereby giving a mixture of fumarate or maleic ester monomers. Suitable commercially available alcohols such as tallow and "Lorol" alcohols may also be used in forming the unsaturated dicarboxylic acid ester. "Lorol" alcohol is a mixture of straight chain aliphatic monohydric alcohols having about 12 to 18 carbon atoms per molecule and is obtained by the hydrogenation of coconut oil. Lauryl alcohol predominates in this mixture of alcohols sold commercially as "Lorol" alcohol. The tallow alcohols which are also useful and commercially available are produced by the hydrogenation of beef tallow and contain approximately equal proportions of cetyl alcohol and stearyl alcohols.

Also useful in the preparation of the unsaturated dibasic acid esters are the Oxo alcohols and mixtures thereof. The Oxo alcohols are produced by the catalytic carbonylation of $C_3$ and $C_4$ mono-olefins with carbon monoxide. The Oxo alcohols and the Oxo process are well known in the prior art. Oxo alcohols containing in the range of about 6 to 10 carbon atoms are preferred for the purposes of the present invention.

While the commercial alcohol mixtures and Oxo alcohols described above are highly useful in preparing the dibasic acid ester monomer, the straight chain normal aliphatic alcohols are definitely preferred because they impart superior sludge dispersancy to the tripolymeric additive when dissolved in oil.

The third monomer, which is the ester of an unsaturated alcohol and a saturated monocarboxylic acid, will have the following formula:

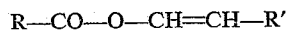

wherein R is an alkyl group containing about 1 to 20 carbon atoms and R' is selected from the group consisting of hydrogen and alkyl groups containing 1 to 20 carbon atoms. Preferably R is an alkyl group containing from 1 to 7 carbon atoms and R' is hydrogen. Thus the third monomer is preferably the vinyl ester of an aliphatic monocarboxylic acid having 2 to 8 carbon atoms per molecule. Vinyl acetate is a particularly preferred vinyl ester although other vinyl esters such as the vinyl esters of propionic, lauric, palmitic, coconut oil, or Oxo acids are operable.

The tripolymeric additives of this invention are prepared by the use of conventional polymerization catalysts, such as the peroxide type catalyst. These catalysts under reaction conditions decompose giving free radicals which initiate the chain polymerization reaction. Examples of suitable catalysts which satisfactorily initiate the polymerization are tertiary-butyl hydroperoxide 2,2, bis (tertiary-butyl-peroxy) butane, di-tertiary-buytl peroxide, and di-cumyl peroxide. A particularly preferred catalyst is tertiary butyl perbenzoate.

The rate of decomposition of the catalyst and hence its effect may be increased by certain actuators such as benzoin, aryl sulfuric acid, and oil soluble metal compounds such as iron, stearate or naphthenate. The polymerization is carried out at temperatures below degradation, e.g., 200° C. and preferably at temperatures in the range of 50° to 100° C.

The concentrations for the catalyst are in the range of 0.1 to 3.0% by weight based on the total weight of the monomer mixture. Preferably the concentration should be in the range of 0.2 to 1.5% by weight. The catalyst may be added directly to the reactants in the form of a solution or slurry.

The reaction is preferably carried out by mixing the reactants and catalyst in an inert atmosphere, for example nitrogen, at either atmospheric or increased pressure. As the polymerization reaction proceeds, the reaction mixture will thicken. The degree of completion of the reaction may be followed by means of viscosity measurements. It is advisable to add a diluent such as white oil, etc. to prevent the reaction mixture from becoming so thick that it can no longer be efficiently mixed or stirred. The diluent is preferably added in sufficient quantities that by completion of polymerization an additive concentrate containing between 25 and 65% by weight of the tripolymeric additive in oil is obtained.

The lubricant compositions of the present invention include the oil concentrates resulting from the polymerization process as described above. These concentrates can be further diluted with lubricating oils or they can be added to fuel oils to improve the properties thereof.

Thus, the compositions of the present invention may consist of oil concentrates containing from 25 to 65% by weight of the tripolymeric additive as well as lubricating oil compositions containing 0.25 to 25% by weight preferably about 1 to 10% by weight of the tripolymeric additive. The tripolymer may also be incorporated in heating oils such as gas oils or other middle distillates to give compositions according to the present invention. Generally smaller proportions are required when used in heating fuels. For example, from about 0.005 to 2% by weight and preferably from about 0.01 to 0.5% by weight of the tripolymer, based on the total weight of the heating oil, will be used to improve the sludge inhibiting properties of the heating oil.

The tripolymer is particularly effective as an additive for mineral lubricating oils. The tripolymer may be used, however, with other oils such as those oils derived from animal or vegetable sources. Especially useful synthetic lubricating oil compositions are derived from complex esters, diesters, and mixtures thereof containing minor amounts of the tripolymeric additives of this invention.

The oil compositions of the present invention may also include conventional fuel or lubricating oil additives such as oil soluble sulfonates, metal salts of alkyl phenol sulfides, pour depressants, extreme pressure additives, and anti-wear and anti-oxidant additives.

The present invention may be illustrated by the following examples:

EXAMPLE I

The following mixture was polymerized at 60° C. under reflux for 24 hours, using benzoyl peroxide as a catalyst, and lauryl alcohol as a reaction modifier.

Palm kernel fumarate_____ 75% by weight  
Vinyl acetate_____ 19% by weight  
N-vinyl pyrrolidone_____ 4% by weight  
Lauryl alcohol_____ 2% by weight  
} 100 parts by weight Benzoyl peroxide_____ 2 parts by weight (per 100 parts by weight of monomer mixture).

The polymeric product was stripped under vacuum and 5% by weight was dissolved in mineral oil having a viscosity of 43 SUS at 210° F. The solution was designated Blend "A."

The detergency of Blend "A" was assessed by determining the amount of dry used oil sludge it would maintain in suspension using 10 grams of dried used oil sludge in 90 grams of the blend.

The Dispersancy Test was conducted by adding 10 grams of sludge to 90 grams of Blend A and heating to 200° F. in an oil bath with constant stirring. The mixture was next allowed to settle for 24 hours at 200° F. After settling, the top 25 cc. of the mixture were poured off into a centrifuge tube and diluted with hexane to a total volume of 100 cc. The mixture was then centrifuged and the solids collected in order to evaluate the sludge suspending ability of the oil blend. The results are given in Table I.

Table I

| | Blend A | Base Oil |
|---|---|---|
| Kinematic Viscosity in cs. at 100° F | 215 | 109 |
| Kinematic Viscosity in cs. at 210° F | 23 | 12 |
| Viscosity Index | 127 | 102 |
| Percent Vol., dry used oil sludge suspended | 60 | 3 |

Low temperature engine tests were also carried out in Chevrolet 216 cubic inch 6 cylinder engine, using 5% by volume of the tripolymeric material obtained above dissolved in a mineral oil having a kinematic viscosity at 100° F. of 66 cs. and designated Blend "B." This is a 110 hour cyclic low temperature test using a sludge prone fuel and is designed to emphasize sludge formations. The results are given in Table II.

Table II
ENGINE DEMERITS

[110 hrs. Chevrolet 4-45 low temperature engine test]

| | Overall Sludge | Piston Skirt Varnish | Overall Engine |
|---|---|---|---|
| Base Oil | 3.34 | 6.96 | 3.30 |
| Blend "B" | 1.47 | 2.10 | 1.93 |

The engine ratings are demerit ratings based on a visual rating scale of 0 to 10, 10 being completely covered and 0 being free of deposits.

Further tests were carried out in Petter AV-1 diesel engine using Blend "A" described above, except that 5% by volume of the tripolymer was used in the base oil and designated Blend "C." This test is designed to correlate with the 480 hr. Caterpillar CRC-L1 test procedure. The results are given in Table III.

Table III

120 HOUR PETTER AV-1 DIESEL ENGINE TEST MERIT RATINGS

| | Base Oil | Blend "C" |
|---|---|---|
| Compression ring sticking | 13.0 | 25.6 |
| General deposits | 7.2 | 8.7 |
| Scraper ring sludge | 3.0 | 9.0 |
| Piston land lacquer | 2.3 | 1.5 |
| Piston skirt lacquer | 14.1 | 23.7 |
| Total deposit | 26.6 | 42.9 |

The engine ratings in this instance are merit ratings and indicate that Blend "C" gives a much cleaner engine than does the base oil.

EXAMPLE II

The following mixture was polymerized at 70° C. under reflux using benzoyl peroxide as catalyst.

| | |
|---|---|
| Cetyl/stearyl fumarate [1] | 21.7% by weight ⎫ |
| Iso-octyl fumarate | 53.6% by weight ⎪ 100 parts |
| Vinyl acetate | 19.7% by weight ⎬ by weight. |
| N-vinyl pyrrolidone | 5.0% by weight ⎭ |
| Benzoyl peroxide | 0.4 part by weight (per 100 parts by weight of monomer mixture). |

[1] Approximately equal proportions of cetyl and stearyl fumarates.

The partly copolymerized mixture was cut back with 10% by weight of a mineral oil having a viscosity of 43 SUS at 210° F., and allowed to completely polymerize, then cut back further with the mineral oil to give an oil solution containing 40% by weight of the tripolymer, filtered and stripped under vacuum. This blend was designated "Blend D."

As a comparison, another mixture was polymerized at 70° C. under reflux using benzoyl peroxide as a catalyst. The mixture was as follows:

| | |
|---|---|
| Decyl/octyl methacrylate | 95% by weight ⎫ 100 parts |
| N-vinyl pyrrolidone | 5% by weight ⎭ by weight. |
| Benzoyl peroxide | 0.4 part by weight (per 100 parts by weight of monomer mixture. |

After copolymerizing according to the procedure of Example I, the reaction product was cut back with a mineral oil having a viscosity of 43 SUS at 210° F. to give an oil solution containing 50% by weight of the copolymer. This blend was designated "Blend E."

Table IV illustrates the improved dispersancy and pour point depressancy of Blend D over Blend E when incorporated in an SAE 30 base mineral lubricating oil in such a manner as to give a final tripolymer content of 5% by weight, based on the total weight of the oil.

Table IV

| | Kinematic Viscosity, cs. | | | Pour Point, ° F. | Dispersancy No. |
|---|---|---|---|---|---|
| | 100° F. | 210° F. | Viscosity Index | | |
| Base Oil | 109 | 12 | 102 | +15 | 3 |
| Base Oil containing Blend D | 302 | 33.4 | 127 | −10 | 60 |
| Base Oil containing Blend E | 185 | 25 | 134 | +15 | 53 |

EXAMPLE III

The following mixture was polymerized at 60° C. under reflux using benzoyl peroxide as a catalyst, and lauryl alcohol as reaction modifier.

| | |
|---|---|
| Lauryl fumarate | 75.2% by weight ⎫ |
| Lauryl alcohol | 2.0% by weight ⎪ 100 parts |
| Vinyl acetate | 18.8% by weight ⎬ by weight. |
| N-vinyl pyrrolidone | 4.0% by weight ⎭ |
| Benzoyl peroxide | 2 parts by weight (per 100 parts by weight of monomer mixture). |

After polymerization the reaction product was cut back with a mineral oil having a viscosity of 43 SUS at 210° F. to give an oil solution containing 50% by weight of tripolymer, and filtered and stripped under vacuum. This blend was designated "Blend F."

Blend F was incorporated in a gas oil blend consisting of 60% by weight of a gas oil boiling in the range of 375°–675° F. and 40% by weight of a cracked gas oil boiling in the range of 425–625° F. The amount of Blend F incorporated was such that the final solution contained 0.1% by weight of the tripolymer. The filter plugging and sediment potential of Blend F was then tested and compared with the original gas oil blend. The results are shown in Table V.

Table V

| | Filter Plugging Demerit [1] | Potential Sediment Demerit [2] |
|---|---|---|
| Gas Oil Blend | 8.4 | 1.9 |
| Gas Oil Blend +0.01% Copolymer (Blend F) | 0.7 | 0.2 |

[1] The filter plugging demerit figure is a measure of the filterability of the oil, which after heating under standard conditions to induce sludge, is filtered under pressure through a felt pad. The maximum demerit is 10.

[2] The potential sediment demerit is a measure of the insoluble sediment which would be formed under prolonged storage conditions. A portion of the sample is filtered, and a separate sample heated for 16 hours at 210° F., and after cooling, is filtered under similar conditions. The difference in the amount of sediment obtained from the above filtrations is termed the potential sediment demerit.

EXAMPLE IV

The following example illustrates the preparation of the tripolymer of this invention using a mixture of fumarate esters prepared from two different commercial alcohols. The commercial alcohols are (1) tallow alcohol (a mixture in approximately equal proportions of cetyl and stearyl alcohols) and (2) $C_8$ Oxo alcohols.

The preparation of the two fumarate esters used in the copolymer is as follows:

*Cetyl-stearyl fumarate (tallow alcohol).*—Equivalent quantities of fumaric acid and cetyl-stearyl alcohol, 1% by weight of sodium bisulphate and 50% by weight of toluene, were refluxed for 15 hours in an apparatus designed to prevent the water of esterification, removed by means of toluene, from returning to the reaction mixture. The catalyst was removed from the product by filtration and the filtrate stripped up to 150° C. under 0.5 mm. Hg pressure. Product obtained did not require washing before using as a polymer feed. Cetyl/stearyl fumarate was obtained as a hard waxy solid melting at about 50° C.

*Iso-octyl fumarate ($C_8$ Oxo alcohol).*—The alcohol component of this ester was a $C_8$ Oxo alcohol prepared by catalytic carbonylation and hydrogenation of a heptene cut of copolymer formed by the polymerization of $C_3$ and $C_4$ mono-olefins. The fumaric acid was heated with 50 wt. percent of an excess of the $C_8$ Oxo alcohol under reflux conditions of 150° C. rising to 200° C. for a period of 4 hours. The excess octanol served as a water entrainer and removed the water of esterification. The product was stripped at 150° C. at a final pressure of 0.5 mm. mercury and the liquid product so obtained was suitable for the polymerization reaction without further purification.

Table VI shows the composition of the polymers prepared with the above fumarate mixture. Table VII shows the properties of these polymers obtained by the use of both benzoyl peroxide and t-butyl perbenzoate as a catalyst. The superiority of the latter catalyst is apparent in the table.

The monomers and catalyst of Table VI were mixed and heated to reaction temperature. When the viscosity had reached the level shown in the table a diluent oil was added to stop the reaction. The product was stripped in vacuum at 100° C. and 5 mm. pressure for 1 hour.

Table VI
COMPOSITION OF POLYMERIC ADDITIVES

| Prep. No. | N-vinyl pyrrolidone (grams) | Vinyl Acetate (grams) | Iso-Octyl Fumarate (grams) | Ceto-Stearyl Fumarate (grams) | Catalyst (grams) | Average Batch [1] Temp. (°C.) | Viscosity Before cutback [2] (Stokes) | Vinyl Acetate Removed on Vacuum Stripping (grams) |
|---|---|---|---|---|---|---|---|---|
| 1 | 15 | 75 | 150 | 60 | 1.2 BzP [3] | 80 | 3,000 | 8 |
| 2 | 15 | 75 | 150 | 60 | 1.2 BzP | 80 | 150 | 34 |
| 3 | 15 | 75 | 150 | 60 | 1.2 TBPB [4] | 80 | 600 | 42 |
| 4 | 45 | 45 | 150 | 60 | 1.5 BzP | 75 | 300 | 21 |
| 5 [5] | 45 | 45 | 150 | 60 | 1.5 BzP | 70 | 120 | 21.5 |
| 6 | 45 | 45 | 150 | 60 | 1.2 TBPB | 85 | 1,100 | 26 |
| 7 | 45 | 45 | 150 | 60 | 1.2 TBPB | 65 | 700 | 29 |

[1] Bath temperature kept constant and adjusted to initiate reaction.
[2] Polymer cut back with KA-30 (a light mineral oil having a viscosity @ 100° F. of 150 SSU and a V.I. of 115) to give a final 50 weight percent concentrate.
[3] BzP = benzoyl peroxide.
[4] TBPB = t-butyl perbenzoate.
[5] 5 wt. percent KA-30 (15 g.) added at start of the reaction.

TABLE VII
PHYSICAL PROPERTIES OF POLYMERIC ADDITIVES

| Prep. No. | Molecular Weight | Viscosity Index Ceiling in Mineral Oil [1] | ASTM Slope, 4 wt. percent conc. in Mineral Oil [1] | Pour Point, 4 wt. percent conc. in Mineral Oil [1] | Sludge Dispersancy, Vol. percent (5 wt. percent conc. of Tripolymer in U.S. EHD-30 [3] Motor Base Oil) |
|---|---|---|---|---|---|
| 1 | 40,000 | 145 | 0.571 | −10 | 89 |
| 2 | 35,000 | 141 | 0.602 | −10 | 77.5 |
| 3 | 83,000 | [2] 150 | 0.500 | −10 | 62.5 |
| 4 | 18,500 | [2] 145 | 0.613 | | 85 |
| 5 | 15,000 | [2] 147 | 0.589 | | 65 |
| 6 | 48,000 | [2] 152 | 0.507 | | 57.5 |
| 7 | 100,000 | [2] 154 | 0.472 | | 60 |

[1] A light mineral oil of Mid-Continent origin, 43 SSU viscosity at 210° F. and a V.I. between 95–100.
[2] Polymer eventually precipitated on storage at 20° F. even at 1 wt. percent concentration in a light mineral oil.
[3] Esso Heavy Duty Motor Oil—SAE 30 Base.

EXAMPLE V

The following example illustrates the benefits to be derived from the use of fumarate monomers prepared from straight chain alcohols.

Four tripolymers of this invention were prepared with different types of fumarate ester monomers. These tripolymers were prepared by blending the monomers and catalyst at room temperature and stirring while raising the temperature to 80° C. The reactants were blanketed under nitrogen and the polymerization continued until the products had a viscosity in the order of 500 centistokes at 80° C. The tripolymer products were then diluted with 150 grams of a mineral oil and vacuum stripped to remove excess final acetate at 100° C. in 5 millimeters pressure for one hour. The mineral oil used in these experiments was obtained from a Kuwait crude by means of distillation, phenol extraction and propane dewaxing. The mineral oil used had a viscosity of 5.3 centistokes at 10° F. and 32 centistokes at 100° F.

The tripolymers are hereinafter designated tripolymer A, B, C, and D. The typical monomer composition for one of these tripolymers is shown in Table VIII.

Table VIII
MONOMER COMPOSITION OF TRIPOLYMER A

| | Grams |
|---|---|
| Octyl fumarate | 548 |
| Cetyl-stearyl fumarate | 215 |
| N-vinyl pyrrolidone | 100 |
| Vinyl acetate | 133 |
| Tert. butyl perbenzoate | 4 |

Tripolymers B, C, and D were prepared with the same weight ratio of monomers as tripolymer A, but differed from tripolymer A as follows: In tripolymer B, iso-octanol fumarate was substituted for the mixture of octyl fumarate and cetyl-stearyl fumarate of tripolymer A. In tripolymer C, 2-ethyl-hexanol fumarate was substituted for the fumarate mixture of tripolymer A. In tripolymer D a normal octanol fumarate was substituted for the fumarate mixture of tripolymer A.

Tripolymers B through D were then blended in a mineral lubricating oil at 2.5 wt. percent concentration of active polymer and the oil blends were tested in a standard engine sludging test of Table VII, Example IV. After operating the engine under standard operating conditions the engine parts were examined and a demerit figure for the oil under test was obtained. The higher these demerit figures the greater the sludge deposition in the test engine. The demerit figures of the tripolymers B through D are expressed in Table IX as a percentage of the reference demerit rating for the straight lubricating oil.

Table IX

| | Sludge demerit,[1] percent |
|---|---|
| Tripolymer B (iso-octanol) | 130 |
| Tripolymer C (2-ethyl-hexanol) | 80 |
| Tripolymer D (Normal octanol) | 35 |

[1] Engine sludging test method of Rogers, Rice, and Jonach SAE Transactions 64 (1946), 785.

A final experiment was carried out using equivalent quantities of lauryl fumarate in place of the octyl fumarate and cetyl-stearyl fumarate ester mixture of Table VIII. This tripolymer prepared from lauryl fumarate gave a sludge demerit in the range of 14 to 16%.

The results of the above tests clearly indicate that tripolymers containing fumarate esters prepared with a straight chain alcohol give highly superior sludge dispersancy to a mineral lubricating oil, than do similar tripolymers prepared with fumarate esters containing branched chain alcohol substituents.

What is claimed is:

1. An oil soluble polymer, useful as a lubricating oil additive for inhibiting sludge formation and increasing viscosity index of a lubricating oil, of (A) 30 to 50 mole percent of a polymerizable unsaturated ester of a monobasic saturated alcohol containing 1 to 20 carbon atoms and an ethylenically mono-unsaturated dicarboxylic acid containing 2 to 10 carbon atoms per molecule, (B) 1 to 35 mole percent of an N-vinyl substituted cyclic amide having the formula:

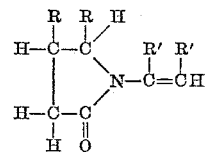

wherein R and R' are selected from the group consisting of hydrogen and $C_1$ to $C_{12}$ alkyl groups, at least one of the R groups being hydrogen, and (C) 15 to 69 mole percent of an ester having the formula:

$$R—CO—O—CH=CH—R'$$

wherein R is an alkyl group containing 1 to 20 carbon atoms and R' is selected from the group consisting of hydrogen and alkyl groups containing 1 to 20 carbon atoms.

2. A polymer according to claim 1, wherein said ethylenically monounsaturated dicarboxylic acid contains 4 carbon atoms per molecule; wherein said cyclic amide is N-vinyl pyrrolidone; and wherein in the formula $R—CO—O—CH=CH—R'$, said R contains 1 to 7 carbon atoms and said R' is hydrogen.

3. A lubricating oil composition containing a major proportion of a lubricating oil and 0.25 to 25% by weight of the polymer of claim 1.

4. A fuel oil composition containing a major proportion of fuel oil and 0.005 to 2.0% by weight of the polymer of claim 1.

5. An oil soluble tripolymeric additive of about 30 to 50 mole percent of a fumarate ester of a straight aliphatic alcohol having 1 to 20 carbon atoms per molecule, 1 to 35 mole percent of N-vinyl pyrrolidone and 15 to 69 mole percent of vinyl acetate.

6. An oil soluble tripolymeric additive according to claim 5 wherein said fumarate ester is lauryl fumarate.

7. A process of preparing an oil soluble polymer comprising copolymerizing (A) 30 to 50 mole percent of a polymerizable unsaturated ester of a monobasic saturated alcohol containing 1 to 20 carbon atoms and an ethylenically monounsaturated dicarboxylic acid containing 2 to 10 carbon atoms per molecule, (B) 1 to 35 mole percent of an N-vinyl substituted cyclic amide having the formula:

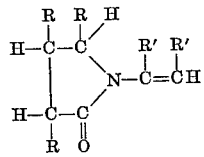

wherein R and R' are selected from the group consisting of hydrogen and $C_1$ to $C_{12}$ alkyl groups, at least one of the R groups being hydrogen, and (C) 15 to 69 mole percent of an ester having the formula:

$$R—CO—O—CH=CH—R'$$

wherein R is an alkyl group containing 1 to 20 carbon atoms and R' is selected from the group consisting of hydrogen and alkyl groups containing 1 to 20 carbon atoms, at a temperature of about 50 to 100° C. in the presence of 0.1 to 1.5% by weight of peroxide catalyst.

8. A process according to claim 7 wherein said catalyst is tertiary butyl perbenzoate.

References Cited in the file of this patent

UNITED STATES PATENTS

| | | |
|---|---|---|
| 2,497,705 | Werntz | Feb. 14, 1950 |
| 2,667,473 | Morner et al. | Jan. 26, 1954 |
| 2,676,949 | Morner et al. | Apr. 27, 1954 |
| 2,737,452 | Catlin et al. | Mar. 6, 1956 |
| 2,737,496 | Catlin et al. | Mar. 6, 1956 |
| 2,744,885 | Benneville et al. | May 8, 1956 |
| 2,825,717 | Cashman et al. | Mar. 4, 1958 |
| 2,892,690 | Lowe et al. | June 30, 1959 |
| 2,892,786 | Stewart et al. | June 30, 1959 |
| 2,980,654 | Perry | Apr. 18, 1961 |